(12) United States Patent
Kim et al.

(10) Patent No.: US 7,493,501 B2
(45) Date of Patent: Feb. 17, 2009

(54) APPARATUS AND METHOD FOR CONTROLLING SYSTEM OPERATION BASED ON BATTERY STATE

(75) Inventors: Yang Hoon Kim, Seongnam-si (KR); Kevin Donghun Yoon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 702 days.

(21) Appl. No.: 11/061,538

(22) Filed: Feb. 18, 2005

(65) Prior Publication Data

US 2006/0061331 A1    Mar. 23, 2006

(30) Foreign Application Priority Data

Sep. 21, 2004   (KR) .............. 10-2004-0075344

(51) Int. Cl.
*G06F 1/26*  (2006.01)
(52) U.S. Cl. .................................. 713/300
(58) Field of Classification Search ............. 713/300
See application file for complete search history.

(56) References Cited

U.S. PATENT DOCUMENTS

| 6,038,515 | A | 3/2000 | Kikuchi et al. ........... 702/63 |
| 6,870,349 | B2 * | 3/2005 | Cook ........................ 320/132 |
| 7,015,822 | B2 * | 3/2006 | Heiser et al. ............. 340/636.1 |
| 7,051,236 | B2 * | 5/2006 | Sanu ........................ 714/22 |

FOREIGN PATENT DOCUMENTS

CN              1503000 A         6/2004

OTHER PUBLICATIONS

Chinese Office Action dated Dec. 8, 2006.

* cited by examiner

*Primary Examiner*—Rehana Perveen
*Assistant Examiner*—Eric Chang
(74) *Attorney, Agent, or Firm*—KED & Associates, LLP

(57) ABSTRACT

Embodiments of an apparatus and method for controlling system operation based on battery state are provided. The apparatus includes a first memory for storing an operating system (OS) to operate and control the system, a microcomputer for controlling the system operation based on battery discharge/charge state information, and a second memory for storing an application containing a microcomputer interface information to control the system operation that is changed depending on the battery state under the OS. An operation based on battery residual quantity is set to an operating system (OS) and a microcomputer. Then, if a user changes operation information based on the battery residual quantity, the changed operation information is applied to the microcomputer through at least one of the OS and an application, and the system is operated based on the changed operation system.

25 Claims, 6 Drawing Sheets

Battery low warning

Notice
- ☑ Sound warning(S)
- ☑ Display message(D)

Warning
- ☑ Computer operation after warning(A)
  - Standby mode
  - Standby mode(S3)
  - Maximum power saving mode(S4)
  - System termination(S5)

Run program
- ☐ Run this program when warning is activated(R)
- [Program configuration(P)]

[OK] [Cancel]

Fig.5

| 구분 | Name | Set value and set range | Binary value | Remarks |
|---|---|---|---|---|
| Battery low | BL1_Percentage | Set by the user within the range of 0-100% | 50% = 0001<br>40% = 0010<br>: | Percentage of Battery low warning |
| | BL1_Enable | LED Enable/Disable | Enable = 0000<br>Disable = 0001 | Battery low warning Enable/Disable |
| | BL1_Operation | Nothing/Standby/ Maximum power saving/ system termination | Nothing = 0000<br>Standby mode = 0001<br>Maximum power saving mode = 0010<br>POWER OFF=0011 | Operated in battery low warning |
| Battery low risk | BL2_Percentage | Set within the range of 0-100% | 30% = 1100<br>20% = 1101<br>: | Percentage of Battery low risk warning |
| | BL2_Enable | LED Enable/Disable | Enable = 0000<br>Disable = 0001 | Battery low risk warning Enable/Disable |
| | BL2_Operation | Nothing/Standby/ Maximum power saving/ system termination | Nothing = 0000<br>Standby mode = 0001<br>Maximum power saving mode = 0010<br>POWER OFF=0011 | Operated in battery low risk warning |

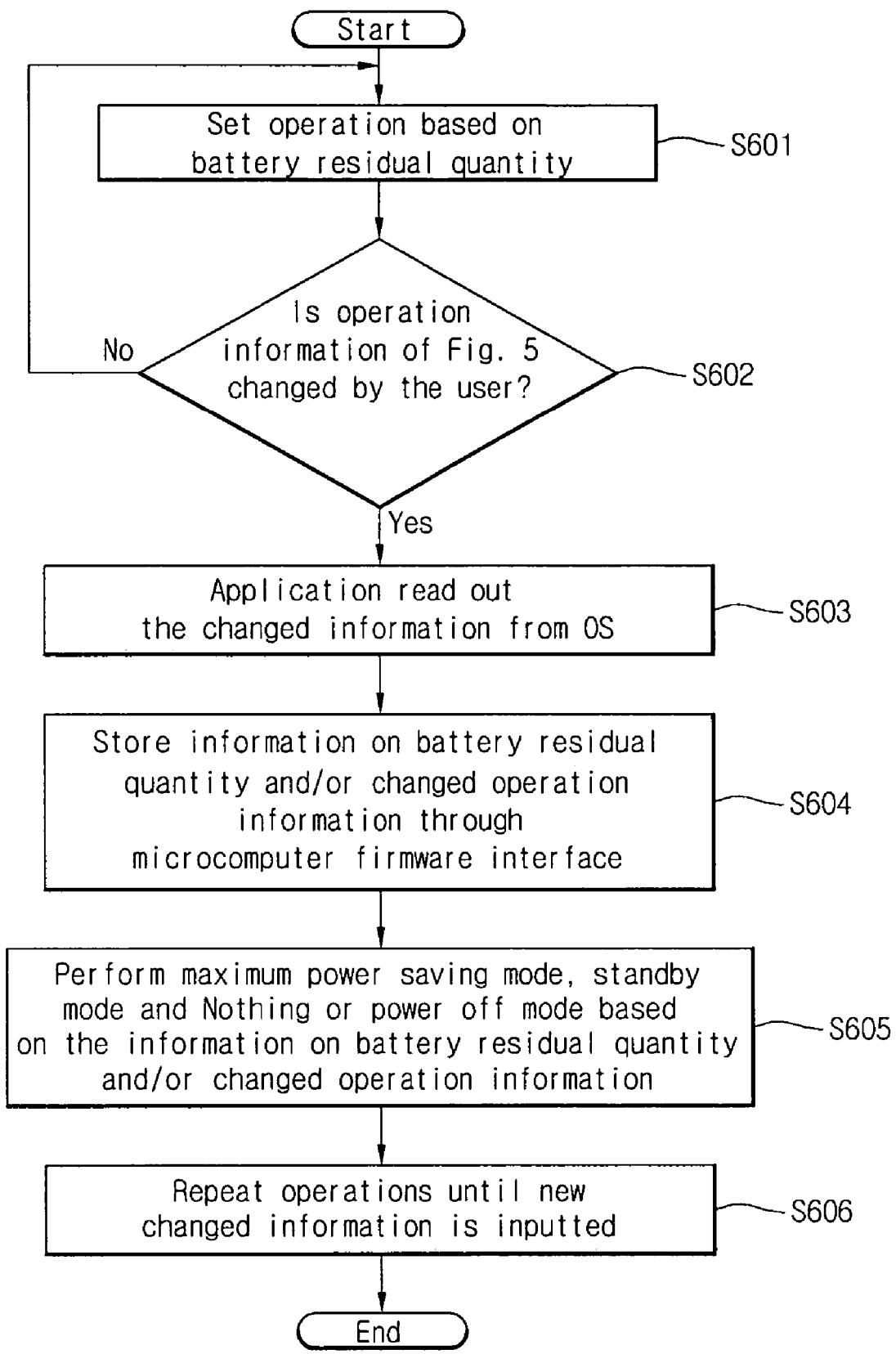

APPARATUS AND METHOD FOR CONTROLLING SYSTEM OPERATION BASED ON BATTERY STATE

BACKGROUND OF THE INVENTION

1. Field of the Invention

The present invention relates to an apparatus and method for controlling a system operation in an operating system (OS).

2. Background of the Related Art

FIG. 1 is a block diagram of a related art computer system. As shown in FIG. 1, the computer system includes a CPU 10, a video controller 11, a host-PCI bridge 12, a memory 13 storing application programs, a video RAM 14, an audio controller 15, a LAN controller 16, a card bus controller 17, a PCI-ISA bridge 18, an LCD 19, a microcomputer 20, a keyboard 21 and an HDD 23 storing an operating system (OS).

Also, the microcomputer 20 includes a ROM 200 and a RAM 201 and a keyboard controller 203. The ROM 200 and the RAM 201 store the information data for operating the system.

FIG. 2 illustrates related art power option registration information associated with warning information (battery low/battery low risk) depending on the use of the battery. As shown in FIG. 2, the battery low warning and/or the battery low risk warning can be independently set.

For example, in the system (e.g., notebook computer and PDA) using an auxiliary power supply (e.g., battery), the warning operation and the system operation can be separately performed depending on the discharge degree of the battery. The battery low warning (first signal) or the battery low risk warning (second signal) are separately set to the OS and the microcomputer, depending on the percentage of the battery residual quantity. The OS and the microcomputer are operated depending on the respective warnings.

FIG. 3 illustrates the related art battery low warning operation and the system operation according to the setup of FIG. 2. As shown in FIG. 3, if the system is in a preset battery low state, the computer system gives a sound warning and displays a message, and then, the system is changed into one state among a standby mode (S3), a maximum power saving mode (S4) and a system termination mode (S5). In general operations, the system is changed into the standby mode and then performs the maximum power saving mode or the system termination mode depending on the discharge degree of the battery.

Under the Windows OS, the related art notebook system provides the battery low information and the battery low risk information in association with the battery residual quantity. These warnings must be operated according to the user setup.

However, the user can change the battery related information. For example, when the warning or action is taken depending on the battery residual quantity, the user can change the information on the battery residual quantity and the warning action.

Under the Window OS, the changed battery information is not transmitted to the microcomputer that controls the battery. Therefore, it is difficult for the microcomputer to perform the correct response as the user desires. That is, the current notebook computer or the PDA has the battery as the auxiliary power supply. Most of the OSs provide several battery related events because the power is abruptly cut off when the battery is used up.

As described above, the related art apparatus and method for controlling system operation in an operating system (OS) have various disadvantages. For example, since the related art OSs have no suitable interface specification for the microcomputer, it is impossible to take appropriate actions depending on the battery residual quantity, which is updated by the OS. Further, the respective devices may not be operated according to the updated information on the battery residual quantity.

In addition, the system may wake up even in a preset specific mode, resulting in system crash caused by the battery consumption. The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide an apparatus and method for controlling system operation that substantially obviates one or more problems due to limitations or disadvantages of the related art.

Another object of the present invention is to provide an apparatus and method for controlling system operation in which when operation information depending on battery residual quality is changed, a controller controls the system based on the changed operation information, or maintains a specific mode that is preset depending on the battery residual quantity.

Another object of the present invention is to provide an interface between an OS and a microcomputer and a control method thereof, in which a notebook computer environment can be made convenient to a user.

Another object of the present invention is to provide an apparatus and method for controlling system operation, in which a designated action associated with battery residual quantity can be suitably performed by providing information changed between an OS and a battery to a microcomputer.

Another objection of the present invention is to provide an apparatus and method for controlling system operation, in which battery operation information can be modified/operated based on changes using a newly added microcomputer firmware interface to an application to transfer the changed battery operation information to the microcomputer.

Another object of the present invention is to provide an apparatus and method for controlling system operation, in which when the system is powered on or when the user changes the battery related setup, an application can read out changed information based on the battery residual information from an OS and provide the same to a microcomputer from operations thereon based on the provided values.

Another object of the present invention is to provide an apparatus and method for controlling system operation, in which peripheral devices can be controlled depending on the changed battery residual information by a microcomputer.

Another object of the present invention is to provide an apparatus and method for controlling system operation, in which when the system is in a prescribed mode associated with the battery residual quantity, the prescribed set mode is maintained without waking up the system to reduce a likelihood of or prevent an abrupt system crash.

In order to achieve at least these objects or other advantages in a whole or in part and in accordance with one aspect of the invention there is provided an apparatus for controlling system operation based on battery state, the apparatus includes a first memory configured to store an operating system (OS) to operate and control the system, a controller configured to control a battery state information table and a second memory configured to store an application configured to have an interface to the controller and contain the battery state information table to control between the system operation and the controller, wherein the battery state information table is changed depending on a battery state under the OS.

To further achieve at least these objects or other advantages in a whole or in part and in accordance with one aspect of the invention, there is provided a method for controlling system operation based on battery state, the method includes setting an operation based on a battery information table to an operating system (OS) and a microcomputer, checking whether the battery information table is changed, reading out the changed battery information from the changed battery information table using an application, applying the changed battery information to the microcomputer, wherein the application transfers the changed battery information to the microcomputer through a firmware interface and repeatedly performing the checking, reading and applying.

To further achieve at least these objects or other advantages in a whole or in part and in accordance with one aspect of the invention there is provided a method for controlling system operation based on battery state, the method includes setting an operation based on first and second battery low state information to an operating system (OS) and a controller, changing one of the first and second battery low state information based on the battery residual quantity, and applying the changed operation information to the controller, wherein the changed operation information is a peripheral device control information.

To further achieve at least these objects or other advantages in a whole or in part and in accordance with one aspect of the invention there is provided a method for controlling system operation based on battery state, the method includes updating a power information, storing the updated power information in a microcomputer to control a system and determining the system wake-up when a system operation is in battery low operations by maintaining a current operation mode when a battery residual power is below a predetermined value regardless of preset operations based on the battery residual power for the battery low operations of the current operation mode.

To further achieve at least these objects or other advantages in a whole or in part and in accordance with one aspect of the invention there is provided a method for controlling system operation based on battery state, the method includes updating a power information, storing the updated power information in a microcomputer to control the system and determining system wake-up, considering at least one of whether a current operation mode of the system is a specific mode, whether a current battery state is in the range of the updated power information, and whether the updated power information operation is a preset operation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 illustrates a microcomputer firmware interface specification for allowing the changed battery information to operate in the microcomputer under the OS according to an embodiment of the present invention;

FIG. 6 is a flowchart illustrating a preferred embodiment of a method for storing the changed information in association with the battery warning operation.

DETAILED DESCRIPTION OF PREFERRED EMBODIMENTS

Figure 1:
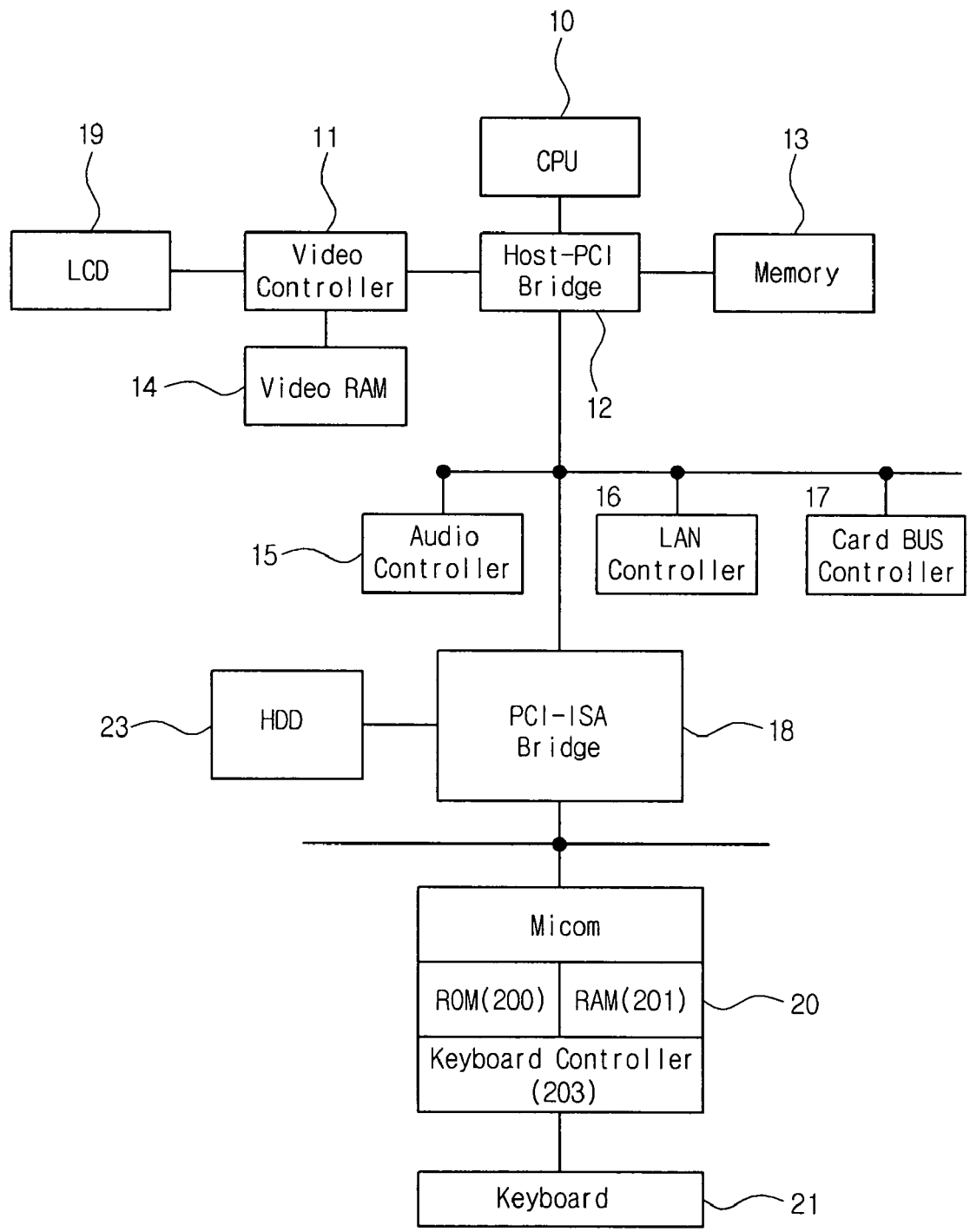
FIG. 1 is a block diagram of a related art computer system.
Figure 2:
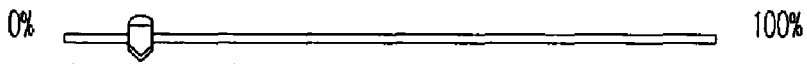
FIG. 2 illustrates related art power option registration information associated with warning information depending on the use of the battery.
Figures 3, 4:
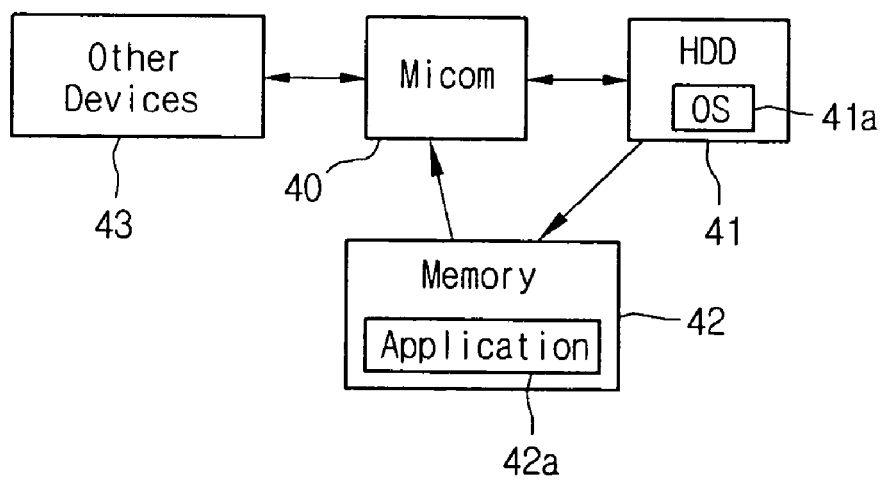
FIG. 3 illustrates a related art battery low warning operation and a system operation according to the setup of FIG. 2.
FIG. 4 is a block diagram of a preferred embodiment of a system including a memory storing an application according to the present invention.

FIG. 4 is a block diagram of an embodiment of a system including a memory that stores an application according to the present invention. As shown in FIG. 4, the system can include an HDD 41 serving as a first memory, a second memory 42, and other device or devices 43 operating in the system. The HDD can store an operating system (OS) 41a for operating and controlling the system. The second memory 42 can store an application 42a containing a microcomputer firmware interface information for controlling the system operation that is changed depending on the battery state under the OS.

When the system is powered on or when the user changes the battery related setup, the application containing the microcomputer firmware interface information can read out the changed information from the OS and store it in the microcomputer. Then, the microcomputer can operate based on the stored value. When the system is powered on or when the user changes the battery related setup, the changed battery operating information can be directly or automatically stored in the application and the microcomputer.

Accordingly, an embodiment of the present invention can provide a microcomputer firmware interface to an application coupled to the HDD 41 (e.g., OS) to transfer selected power saving data (e.g., from a battery or the OS) not provided to or accessible to by the microcomputer 40, which can control a battery.

FIG. 5 illustrates a microcomputer firmware interface specification for allowing the changed battery information to operate in the microcomputer under the OS according to an embodiment of the present invention. As shown in FIG. 5, functions that the user can adjust in association with the battery under the Window OS can be as follows.

Warning enable/disable operation (e.g., BL1_Enable/Disable), warning operation (e.g., BL1_Operation) and warning percentage (e.g., BL1_Percentage), which are associated with the battery low warning information.

Warning enable/disable operation (e.g., BL2_Enable/Disable), warning operation (e.g., BL2_Operation) and warning percentage (e.g., BL2_Percentage), which are associated with the battery low risk warning information. As described above, "BL" is an acronym of "battery low". As shown in FIG. 5, the set values can be arbitrarily set by the user.

As shown in FIG. 5, the interface information associated with the battery low state can include the battery residual percentage information BL1_Percentage, the battery LED on/off information BL1_Enable, and the warning operation information BL1_Operation for performing the operation set by the user. The battery residual percentage information BL1_Percentage can be set within the range of 0-100% based on the battery discharge or charge level and the set battery residual percentage information is stored in a form of binary information or the like.

Based on or relative to the set battery residual percentage information, the battery residual percentage is detected, and the LED enable/disable information Enable/Disable notifying the battery low state can be stored.

Also, in case where the system is in the state corresponding to the battery residual information set by the user, the information BL1_Operation for performing the operation preset by the user can be stored in a form of binary information or the like.

For example, the stored binary information can include a maximum power saving mode (0010), a standby mode (0001), a power off mode (0011), and a state maintenance (e.g., Nothing) mode (0000). In a case where the system operation is at risk due to the low battery, the form of the interface information can be substantially similar to the case when the battery is low.

However, there is or can be a difference in detailed information. For example, the battery residual percentages of the battery warning can be set differently from each other. Such information can include the battery residual percentage information BL2_Percentage, the battery LED on/off information BL2_Enable, and the warning operation information BL2_Operation for performing the operation set by the user. The battery residual percentage information BL2_Percentage can be set based on the battery discharge or charge level and the set battery residual percentage information BL2_Percentage can be stored in a form of binary information. Based on the set battery residual percentage information BL2_Percentage, the LED enable/disable information Enable/Disable (e.g., peripheral device) notifying the battery low risk state can be stored in a form of binary information.

The firmware interface configuration described above can be stored in the OS 41a, the application 42a and then the microcomputer 40. The changed battery information and operation information can be transferred to the microcomputer, such that the desired operation is executed.

FIG. 6 is a flowchart illustrating an embodiment of a method for storing the changed information in association with the battery warning operation. As shown in FIG. 6, an operation based on the battery residual quantity can be set to the OS and the microcomputer (block S601).

It is checked whether or not the user changes the information (e.g., warning information and/or operation information as shown in FIG. 5) based on the battery residual quantity (block S602). If the operation based on the battery residual quantity is changed as shown in FIG. 5 (block S602), the application can read out the changed information through the firmware interface (block S603).

The application can store the changed battery residual information and/or the changed operation information in the microcomputer through the firmware interface (block S604). The operation information based on the changed battery residual information can be applied to and stored in the microcomputer to control the corresponding device.

For example, the microcomputer can control the devices to perform the maximum power saving mode, the standby mode, the Nothing or power off mode, based on at least one of the stored changed information and battery residual quantity (block S605). Thus, the modes of the devices can be changed based on the battery residual quantity.

Such operations can be repeated based on the changed information already stored in the microcomputer until the updated information (such as shown in FIG. 5) is inputted to the microcomputer (block S606). Accordingly, the devices can perform the maximum power saving mode, the standby mode, the Nothing or power off mode, based on the battery residual quantity.

When the user changes the operation information based on the battery residual quantity, the OS can automatically notify the information to the application or the microcomputer. However, the present invention is not intended to be so limited. Alternatively, the application can determine whether the battery residual information is changed or not, and read out the changed information. Then, the changed information is applied to the microcomputer.

The above described method can be applied to the embodiment of FIG. 4 of the present invention. However, the present invention is not intended to be so limited. In addition, the information can be updated when the system is powered on or rebooted.

Figure 7:
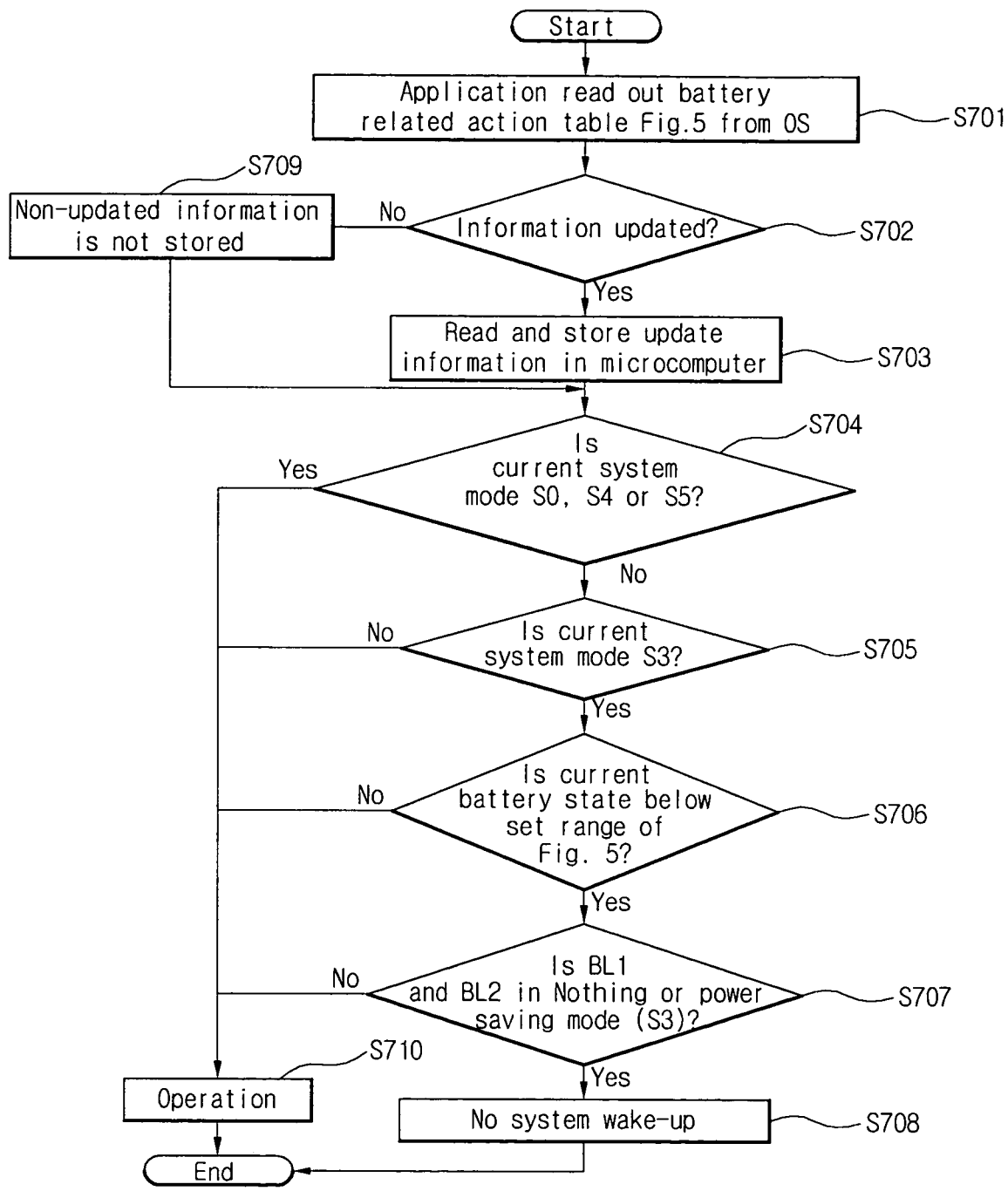
FIG. 7 is a flowchart illustrating another preferred embodiment of a method for operating the system in a specific mode based on the changed information in association with the battery warning operation.

FIG. 7 is a flowchart illustrating another embodiment of a method for operating the system in a specific mode based on the changed information in association with the battery warning operation. As shown in FIG. 7, an operation based on the battery residual quantity can be set to the OS, and the application can read out a battery related action table (e.g., FIG. 5) of the system setting from the OS (block S701). The embodiment of FIG. 7 will be described using the information described in FIG. 5. However, the present invention is not intended to be so limited.

It can be checked whether the information of FIG. 5 (e.g., warning information and/or operation information) based on the battery residual quantity is changed or not (block S702).

In block S702, if the information of FIG. 5 is changed, the application can read out the changed information from the OS through firmware interface and store it in the microcomputer (block S703).

A current operation mode of the system can be checked. For example, it can be checked whether the system is in the S0 mode (normal mode) or in the S4 mode (maximum power saving mode) or in the S5 mode (system off mode) (block S704).

If the system is not in at least one mode of S0, S4 and S5 (block S704), it can be checked whether the current mode is S3 (standby mode) (block S706).

If the current battery state is below the set range of FIG. 5 (block S706), it can be checked whether the system operation in the BL1 (battery low) and BL2 (battery low risk) is in the Nothing mode or in the S3 mode (power saving mode/standby mode) (block S707).

If the system operation in the BL1 and BL2 is in the Nothing mode or in the S3 mode, the system preferably does not wake up (block S708).

The "wake-up" is a process of executing the operation set by the user, for example, the maximum power saving mode or the system termination, so as to wake up the system. However, at this point, the system may be abruptly crashed due to the power consumption during the wake-up process.

Meanwhile, if the preset information of FIG. 5 is not updated (block S702), the battery information is preferably not updated in the microcomputer (block S709).

If the current operation mode of the system is at least one of the S0, S4 and S5 modes in block S704, or if the current mode is not the S3 mode in block S705, or if the current battery state is not below the set range in block S706, or if the BL1 and BL2 operations are not the Nothing/S3 mode in block S707, the preset operations can be executed (block S710). From blocks S710 and S708, the process can be completed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of an apparatus and method for controlling system operations have various advantages. For example, to transfer the changed battery operation information to the microcomputer, the microcomputer firmware interface specification can be newly added to transfer the changed battery operation information to the microcomputer. Then, the battery operation information can be modified/operated in the microcomputer, based on the changed battery operation information under the OS. Also, if the operation based on the battery residual information is the Nothing mode or the power saving mode, the operation state can be maintained without waking up the system.

Accordingly, the changed information between the OS and the battery can be provided to the application containing the microcomputer firmware interface specification through the application, such that the action associated with the battery residual quantity is performed as the user desires. In addition, when the system is powered on or when the user changes the battery related setup, the application can read out the changed information based on the battery residual information from the OS and then store it in the microcomputer. The microcomputer can operate based on the stored values, which can improve the performance of the system.

Further, when the system is in a prescribed mode associated with the battery residual quantity, the set mode can be maintained without waking up the system, thereby preventing the abrupt system crash.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for controlling system operation based on battery state, the apparatus comprising:
   a first memory to store an operating system (OS) to operate and control the system;
   a controller to control a battery state information table; and
   a second memory to store an application configured to have an interface to the controller and contain the battery state information table to control between the operating system and the controller, wherein the battery state information table is changed depending on a battery state under the OS, wherein when the system operation based on a battery residual information of the battery state information table is changed, the application reads out the changed information and stores the changed information in the controller.

2. The apparatus of claim 1, wherein controller interface information includes the battery state information table having at least one of information representing a battery low state and information representing a battery low risk state when the system operation is at risk.

3. The apparatus of claim 2, wherein the controller interface information associated with the battery low state includes a battery residual percentage information (BL1_Percentage), a battery LED on/off information (BL1_Enable), and a warning operation information (BL1_Operation) for performing an operation set by a user.

4. The apparatus of claim 3, wherein the battery residual percentage information stores battery information set based on a battery discharge or charge level, and wherein the battery information has a form of binary information.

5. The apparatus of claim 4, further comprising LED enable/disable information (Enable/Disable) for notifying the battery low state based on the set battery residual percentage information.

6. The apparatus of claim 3, wherein the warning operation information for performing the operation set by the user based on the set battery residual information includes at least one of a maximum power saving mode, a power saving mode, a standby mode, a power off state, and a Nothing mode.

7. The apparatus of claim 6, wherein the Nothing mode maintains a currently set battery mode by not effecting system interrupts.

8. The apparatus of claim 7, wherein the system interrupts include external and internal interrupts except a predetermined key.

9. The apparatus of claim 2, wherein the interface information associated with the battery low risk state includes a battery residual percentage information (BL2_Percentage), a battery LED on/off information (BL2_Enable), and a warning operation information (BL2_Operation) for performing an operation set by a user, wherein the battery residual percentage information stores battery information set based on a battery discharge or charge level, and wherein the battery information is stored as binary information.

10. The apparatus of claim 9, further comprising LED enable/disable information (Enable/Disable) for notifying the battery low risk state based on the set battery residual percentage information.

11. The apparatus of claim 9, wherein the warning operation information for performing the operation set by the user based on the set battery residual information includes at least one of a maximum power saving mode, a power saving mode, a standby mode, a power off state, and a Nothing mode.

12. The apparatus of claim 1, wherein the controller controls a device to perform at least one of a maximum power saving mode, a standby mode, a Nothing or a power off mode, based on at least one of the stored changed information and the battery residual information.

13. The apparatus of claim 1, wherein a performed operation is maintained based on the changed information stored in the controller until an updated information is inputted to the controller.

14. A method for controlling system operation based on battery state, the method comprising:

setting an operation based on a battery information table to an operating system (OS) and a controller;

determining whether the battery information table has changed;

reading out the changed battery information from the battery information table using an application;

applying the changed battery information to the controller, wherein the application transfers the changed battery information to the controller through a firmware interface; and repeatedly performing the determining, the reading and the applying.

15. The method of claim 14, wherein the changed battery information is peripheral device information.

16. The method of claim 15, wherein the peripheral device information is a battery low status LED.

17. The method of claim 14, wherein the application reads out the changed battery information from the OS through the firmware interface, and wherein the battery information table is first battery low state information and second battery low state information.

18. The method of claim 14, wherein when the system operation based on a battery residual information of the battery information table changes, the application reads out the changed information and stores the changed information in the controller.

19. A method for controlling system operation based on battery state, the method comprising:

setting an operation based on first battery low state information and second battery low state information to an operating system (OS) and a controller;

changing one of the first battery low state information and the second battery low state information based on a battery residual quantity; and applying the changed operation information to the controller, wherein the changed operation information is a peripheral device control information, and wherein when the system operation based on the battery residual information is changed, an application reads out the changed information and stores the changed information in the controller.

20. The method of claim 19, wherein the changed operation information is applied to the controller by using an application to establish an interface to the controller to transfer the changed operation information.

21. A method for controlling system operation based on battery state, the method comprising:

updating a power information under an operating system (OS);

storing the updated power information in a controller to control a system; and determining a system wake-up when a system operation is in battery low operations by maintaining a current operation mode when a battery residual power is below a predetermined value regardless of preset operations based on the battery residual power for the battery low operations of the current operation mode.

22. The method of claim 21, wherein an application reads out the updated power information from the operating system (OS) and provides the information to a microcomputer through a firmware interface, stores the changed operation information in the microcomputer, and determines whether a current system mode is a standby mode, and wherein when the power information is not updated, battery information is stored in the microcomputer.

23. The method of claim 21, further comprising:

performing preset operations based on the battery residual power when the current operation mode is not a standby mode.

24. The method of claim 21, further comprising performing a Nothing mode when the system operations is in the low battery operations and the current operation mode is a standby mode when the battery residual power is below the predetermined value.

25. An apparatus for controlling system operation based on battery state, the apparatus comprising:

a first memory to store an operating system (OS) to operate and control the system;

a controller to control the system operation based on battery discharge/charge state information changed under the OS or changed by a user; and a second memory to store an application containing interface information for the controller to control the system operation that is changed depending on the battery state under the OS or the user, wherein when the system operation based on the battery information changes, an application reads out the changed information and stores the changed information in the controller.

* * * * *